(12) United States Patent
McVeagh et al.

(10) Patent No.: US 8,807,021 B2
(45) Date of Patent: Aug. 19, 2014

(54) METHODS OF COOKING IN CONTINUOUS COOKING OVEN SYSTEMS

(75) Inventors: Charles McVeagh, Huron, OH (US);
Scott M. Kane, Sandusky, OH (US);
James E. Randall, Huron, OH (US);
Owen E. Morey, Huron, OH (US);
Robert Stacy, Sandusky, OH (US);
Ramesh M. Gunawardena, Solon, OH (US); Peter Liljegren, Huron, OH (US)

(73) Assignee: John Bean Technologies Corporation, Chicago, IL (US)

( * ) Notice: Subject to any disclaimer, the term of this patent is extended or adjusted under 35 U.S.C. 154(b) by 0 days.

(21) Appl. No.: 13/610,660

(22) Filed: Sep. 11, 2012

(65) Prior Publication Data
US 2013/0004639 A1 Jan. 3, 2013

Related U.S. Application Data

(63) Continuation of application No. 11/408,508, filed on Apr. 21, 2006, now abandoned.

(60) Provisional application No. 60/750,414, filed on Dec. 14, 2005.

(51) Int. Cl.
*A21B 1/48* (2006.01)
*A21B 1/26* (2006.01)
*A23L 1/01* (2006.01)

(52) U.S. Cl.
CPC ............... *A21B 1/26* (2013.01); *A23L 1/0135* (2013.01); *A21B 1/48* (2013.01)
USPC .......................... 99/443 C; 99/443 R; 99/479

(58) Field of Classification Search
CPC .......... A21B 1/245; A21B 1/48; A21B 1/0135
USPC ........ 99/386, 427, 473, 476, 477, 479, 443 C; 426/509, 510, 511, 520; 432/133; 198/838
See application file for complete search history.

(56) References Cited

U.S. PATENT DOCUMENTS

| 3,478,705 A | 11/1969 | Lanham |
| 3,680,474 A * | 8/1972 | Brown ............................ 99/353 |

(Continued)

FOREIGN PATENT DOCUMENTS

| DE | 2 315 435 A1 | 10/1974 |
| EP | 0 528 593 A1 | 2/1993 |

(Continued)

OTHER PUBLICATIONS

Communication Pursuant to Article 94(3) EPC, mailed Feb. 22, 2010, issued in corresponding European Patent Application No. 06025327.5, filed Dec. 7, 2006.

*Primary Examiner* — Tu Hoang
*Assistant Examiner* — Thien S Tran
(74) *Attorney, Agent, or Firm* — Christensen O'Connor Johnson Kindness PLLC

(57) ABSTRACT

A method of cooking in a continuous cooking oven system generally includes transporting food products on a continuous, pervious conveyor through a helical path within a cooking chamber, directing a substantially vertical flow of a heated gaseous cooking medium into either a top end or a bottom end of the helical stack and through the plurality of superimposed tiers, and selectively reversing the substantially vertical flow of heated gaseous cooking medium on a user defined interval.

15 Claims, 5 Drawing Sheets

(56) References Cited

U.S. PATENT DOCUMENTS

| | | | |
|---|---|---|---|
| 3,905,760 A * | 9/1975 | Johansson et al. | 432/176 |
| 3,938,651 A | 2/1976 | Alfred | |
| 4,737,373 A * | 4/1988 | Forney | 426/510 |
| 4,873,107 A | 10/1989 | Archer | |
| 5,078,120 A | 1/1992 | Hwang | |
| 5,243,962 A * | 9/1993 | Hwang | 126/21 A |
| 5,407,692 A * | 4/1995 | Caridis et al. | 426/510 |
| 5,702,245 A | 12/1997 | London | |
| 5,850,781 A | 12/1998 | Kuenen | |
| 5,934,178 A | 8/1999 | Caridis | |
| 6,142,066 A | 11/2000 | Anders | |
| 6,649,879 B1 | 11/2003 | Kohlstrung | |
| 6,658,993 B2 | 12/2003 | Kuenen | |
| 6,716,467 B2 | 4/2004 | Cole | |
| 2005/0092312 A1 * | 5/2005 | Gunawardena et al. | 126/19 R |

FOREIGN PATENT DOCUMENTS

| | | | | |
|---|---|---|---|---|
| FR | 1 360 505 A | 5/1964 | | |
| WO | 84/01266 A1 | 4/1984 | | |
| WO | WO 8401266 A1 * | 4/1984 | | A21B 1/26 |
| WO | 85/05546 A1 | 12/1985 | | |
| WO | 92/13477 A1 | 8/1992 | | |

* cited by examiner

METHODS OF COOKING IN CONTINUOUS COOKING OVEN SYSTEMS

This application is a continuation of U.S. application Ser. No. 11/408,508, filed Apr. 21, 2006, which claims the benefit of U.S. Provisional Application No. 60/750,414 filed Dec. 14, 2005, the disclosures of which are hereby expressly incorporated herein by reference.

FIELD OF THE INVENTION

The invention is directed to a continuous cooking oven system for efficiently cooking and browning food products.

BACKGROUND OF THE INVENTION

Spiral ovens for cooking food products include a cooking surface in the form of pervious conveyor belt for conveying the food products through a cooking chamber in a helical path. A heat source, such as steam, conventional convection and/or forced convection, is provided within the cooking chamber for cooking the food products. Spiral cooking ovens generally have a small footprint while providing a relatively long processing path. However, airflow in such spiral cooking ovens are often impeded and do not directly impact the food products within the cooking chamber. As a result, the food products are subjected to longer cooking cycles which reduces product throughput. Additionally, airflow in spiral cooking ovens is typically unidirectional which limits the ability to brown food products efficiently and often results in browning only occurring on one side of the product. For some food products, browning on a single surface of the food product is acceptable. However, for many food products such as, for example, meat, poultry and bakery products, browning on both sides of the product is desirable.

Continuous cooking ovens include a cooking surface in the form of a pervious conveyor belt for conveying products through a cooking chamber in a linear path. A heat source, such as steam, conventional convection and/or forced convection, is provided within the cooking chamber for cooking the food products. Linear continuous cooking ovens generally provide an environment which promotes uniform color and texture development across the conveyor belt. However, the length and efficiency of linear cooking ovens is limited by space considerations within the production facility.

There is a need or desire for a continuous cooking oven system that efficiently cooks and browns food.

There is a further need or desire for a continuous cooking oven system that occupies less space within a production facility.

SUMMARY OF THE INVENTION

In response to the discussed difficulties and problems encountered in the prior art, a continuous cooking oven system for efficiently cooking and browning food products has been discovered.

A continuous cooking oven system according to the invention includes an enclosure including a first cooking chamber in communication with a second cooking chamber. Each cooking chamber contains a heated gaseous cooking medium. A first continuous conveyor transports food products through a helical path within the first cooking chamber. The first continuous conveyor includes a self-supporting pervious belt including a plurality of superimposed tiers which define a pervious annulus through which the heated gaseous cooking medium may be circulated in a continuous manner by a fan. A second conveyor transports the food products through a linear path within the second cooking chamber. At least one impingement air flow distribution chamber is disposed above the second conveyor within the second cooking chamber and at least one impingement air flow distribution chamber is disposed below the second conveyor within the second cooking chamber. Each impingement air flow distribution chamber may include at least one independently controlled recirculation fan. The second cooking chamber may be in communication with the first cooking chamber via the inlet opening or the outlet opening of the first cooking chamber.

In another embodiment of the invention, an inlet opening of the second cooking chamber of the continuous cooking oven system is in communication with an outlet opening of the first cooking chamber and the second conveyor defines a downwardly extending linear path from the inlet opening of the second cooking chamber to an outlet opening of the second cooking chamber.

In an additional embodiment of the invention, the continuous cooking oven system may further include a thermal fluid heat exchanger positioned in fluid communication with second cooking chamber. A thermal fluid is circulated within the heat exchanger and the heat exchanger operates at a temperature of about 450° F. (about 230° C.) to about 750° F. (400° C.).

In accordance with one embodiment of the present disclosure, a method of cooking in a continuous cooking oven system is provided. The method generally includes transporting food products on a continuous conveyor through a helical path within a first cooking chamber, wherein the continuous conveyor includes a self-supporting, pervious belt assembly, wherein the belt assembly includes a plurality of inner and outer links extending substantially normal to the pervious belt to create a helical stack having inner and outer sidewalls, the helical stack defining a plurality of superimposed, helically extending tiers and an inner channel in fluid communication with at least some of the tiers. The method further includes directing a substantially vertical flow of a heated gaseous cooking medium into either a top end or a bottom end of the helical stack to impinge the top or bottom surfaces of the food products disposed on the plurality of superimposed tiers. The method further includes dividing the first cooking chamber into first and second regions to divert a portion of the substantially vertical flow of a heated gaseous cooking medium to a substantially horizontal cross flow of heated gaseous cooking medium across each of the plurality of superimposed tiers in the helical stack. The method further includes selectively reversing the substantially vertical flow of heated gaseous cooking medium on a user defined interval between (1) a substantially upward direction at the bottom end of the helical stack through the pervious belt to impinge the bottom surfaces of the food products disposed on the pervious belt and (2) a substantially downward direction at the top end of the helical stack to impinge the top surfaces of the food products disposed on the pervious belt.

In accordance with another embodiment of the present disclosure, a method of cooking in a continuous cooking oven system is provided. The method generally includes transporting food products on a continuous, pervious conveyor through a helical path within a cooking chamber. The method further includes directing a substantially vertical flow of a heated gaseous cooking medium into either a top end or a bottom end of the helical stack and through the plurality of superimposed tiers. The method further includes selectively reversing the substantially vertical flow of heated gaseous cooking medium on a user defined interval between (1) a substantially upward direction at the bottom end of the helical path to impinge the bottom surfaces of the food products disposed on the pervious conveyor and (2) a substantially downward direction at the top end of the helical path to impinge the top surfaces of the food products disposed on the pervious conveyor.

In accordance with another embodiment of the present disclosure, a method of cooking in a continuous cooking oven system is provided. The method generally includes transporting food products through a helical path on a plurality of superimposed tiers within a cooking chamber. The method further includes directing a substantially vertical flow of a heated gaseous cooking medium into either a top end or a bottom end of the helical stack and through the plurality of superimposed tiers. The method further includes separating the cooking chamber into a high pressure region and a low pressure region. The method further includes selectively reversing the direction of the substantially vertical flow of heated gaseous cooking medium on a user defined interval to switch the locations of the high and low pressure regions.

DETAILED DESCRIPTION OF THE INVENTION

Figure 1:
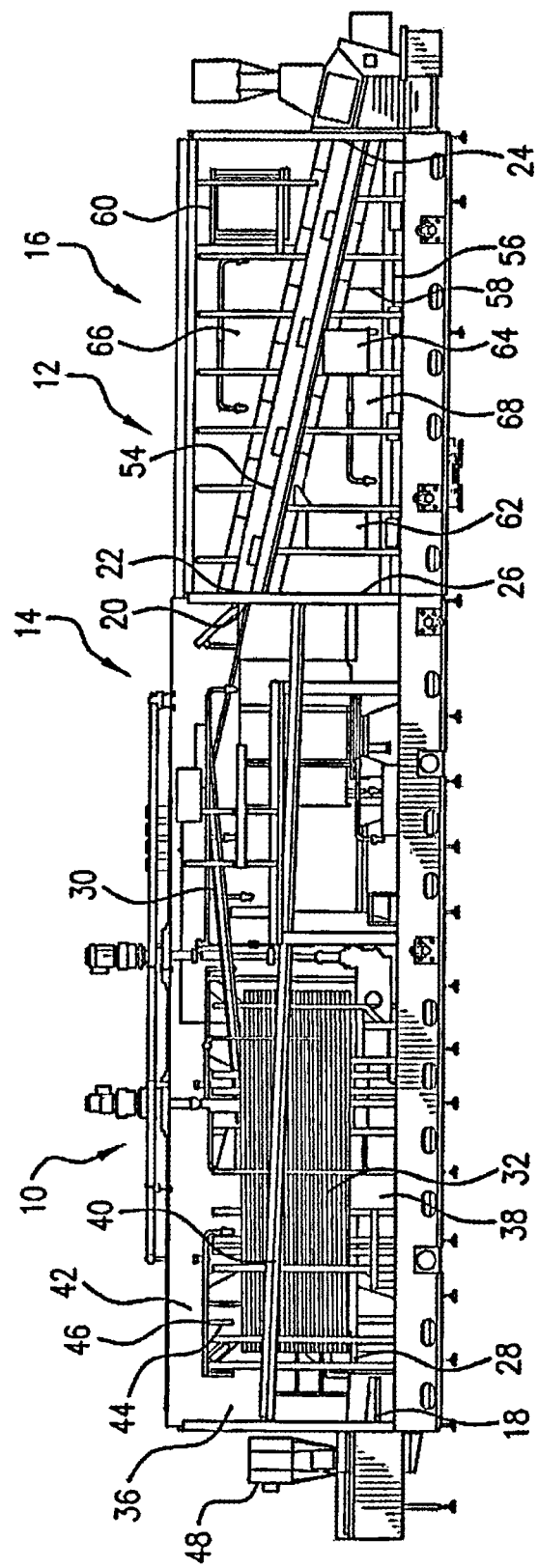
FIG. 1 is a side schematic view of a continuous cooking oven system according to one embodiment of the invention.

Referring to FIG. 1, the continuous cooking oven system 10 includes an enclosure 12 which includes a first cooking chamber 14 in communication with a second cooking chamber 16. Each of the first and second cooking chambers 14, 16 contain a heated gaseous cooking medium such as steam, heated air or both. The first cooking chamber 14 includes an inlet opening 18 and an outlet opening 20 and second cooking chamber 16 includes an inlet opening 22 and an outlet opening 24. The openings 18, 20, 22 and 24 are suitably made as small as feasible to retard the egress of heated gaseous cooking medium from the cooking chambers 14, 16.

In FIG. 1, the first and second cooking chambers 14, 16 share a common wall 26 such that inlet outlet opening 20 of the first cooking chamber 14 and inlet opening 22 of the second cooking chamber 16 are a common opening. In another embodiment (not shown), the first cooking chamber 14 may be spaced apart from the second cooking chamber by a space or a gap such that each chamber has it own side wall. Suitably, the continuous cooking oven system 10 includes a common wall 26 between the first cooking chamber 14 and the second cooking chamber 16 to minimize product cooling which may occur when a defined space or gap is positioned between the first and second cooking chamber.

In FIG. 1, the inlet opening 22 of the second cooking chamber 16 is in communication with the outlet opening 20 of the first cooking chamber. In another embodiment (not shown), the outlet opening 24 of the second cooking chamber may be in communication with the inlet opening 18 of the first cooking chamber 14.

Referring again to FIG. 1, a first conveyor 28 is directed into the first cooking chamber 14 through inlet opening 18 and is designed to carry a large volume of food products to be cooked in the continuous cooking oven system 10. The first conveyor 28 is adapted to follow, through at least a portion of its length, a spiral or helical path through the first cooking chamber 14. Suitably, the first conveyor follows an upwardly extending helical path through the first cooking chamber 14.

Suitably, the first conveyor 28 includes a pervious, continuous conveyor belt 30 including a plurality of superimposed, helically extending tiers forming a belt pile 32 and defining a pervious annulus 34 therethrough. The continuous conveyor belt 30 is designed to fully support food products on at least one surface but is formed to allow a heated gaseous cooking medium to readily flow through the belt without being inhibited by the belt structure. In general, conveyor belt 30 may include a plurality of mutually articulated and interadjustable links forming the two sides of the belt, including a bottom supporting portion interposed between the links. The bottom supporting portions may be made of wire or other surface forming material to provide a supporting plane for the belt. The links are designed as spacers that are arranged to support or be supported by an immediately overlying or underlying tier of the conveyor belt. In this way the first conveyor 28 is self-supporting and no separate belt support is needed between the tiers of the spiral conveying system. Thus, the entire space making up the helical conveyance path within the first cooking chamber 14 is open to the flow of a heated gaseous cooking medium therethrough.

The first cooking chamber 14 is separated into a high pressure region 36 and low pressure region 38 by a mezzanine floor 40 disposed within the first cooking chamber 14. The mezzanine floor 40 includes a first portion 41a disposed within the inner channel of the belt assembly and a second portion 41b extending around the outer perimeter of the belt assembly at substantially the same height relative to the helical stack as the first portion 41a. Each of the first and second portions 41a and 41b have substantially planar first and second sides that are oriented substantially normal to an axis extending substantially vertically through the inner channel of the helically stacked belt pile 32. The inlet opening 18 may be disposed in the low pressure region 38 and the outlet opening 20 may be disposed in the high pressure region 36. An exhaust stack 48 may be disposed adjacent the inlet opening 18 of the first cooking chamber 14 to regulate the egress and ingress of air and to equalize pressure at the inlet opening 18.

Figure 2:
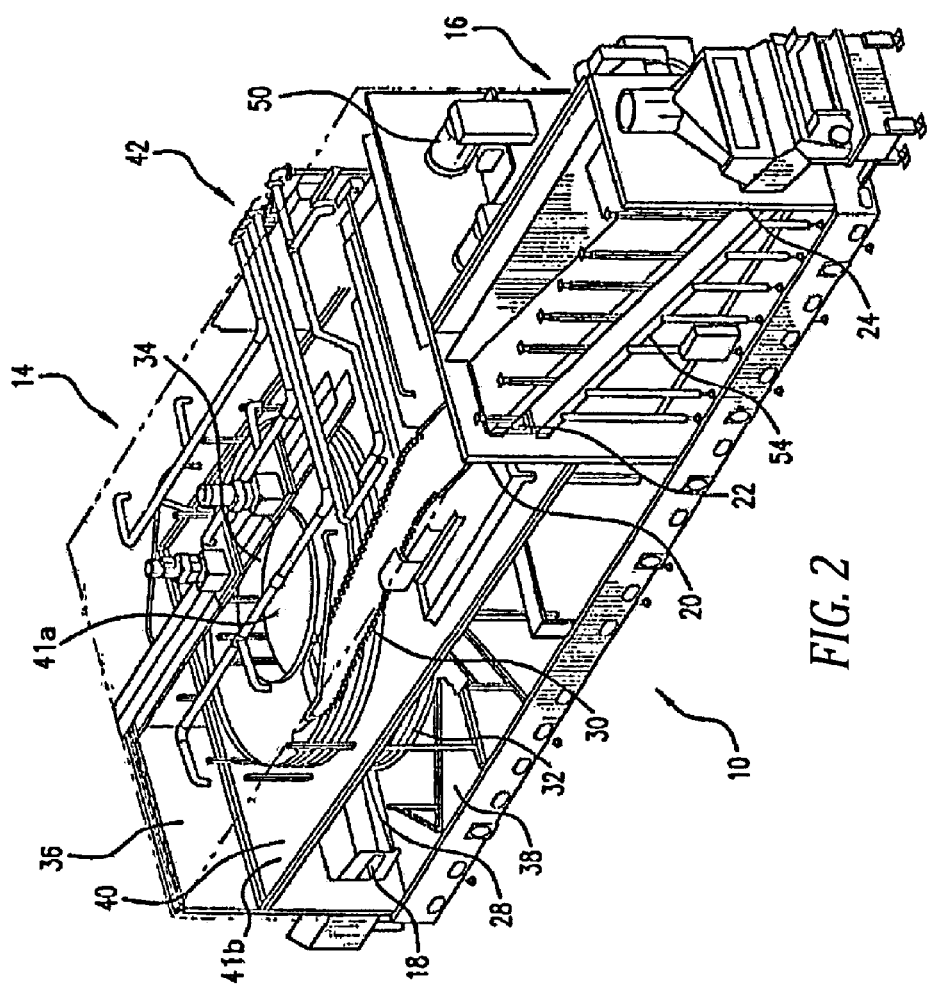
FIG. 2 is a perspective view of a continuous cooking oven system according to one embodiment of the invention.

The interior of the first cooking chamber 14 may be regularly or frequently cleaned to maintain the sanitary conditions required for food processing equipment. Suitably, as shown in FIG. 2, an in-place cleaning system 42 may be disposed within the first cooking chamber 14. The cleaning system may include a plurality of spray nozzles or balls 44 disposed at various locations and coupled to a supply pipe 46. Suitably, the supply pipes 46 are coupled to a source of cleaning fluid (not shown). Suitably, the cleaning fluid is supplied to the spray nozzles 44 under pressure to effectively drive the cleaning fluid into grease or soil found on the surfaces of the first cooking chamber 14.

Figure 3:
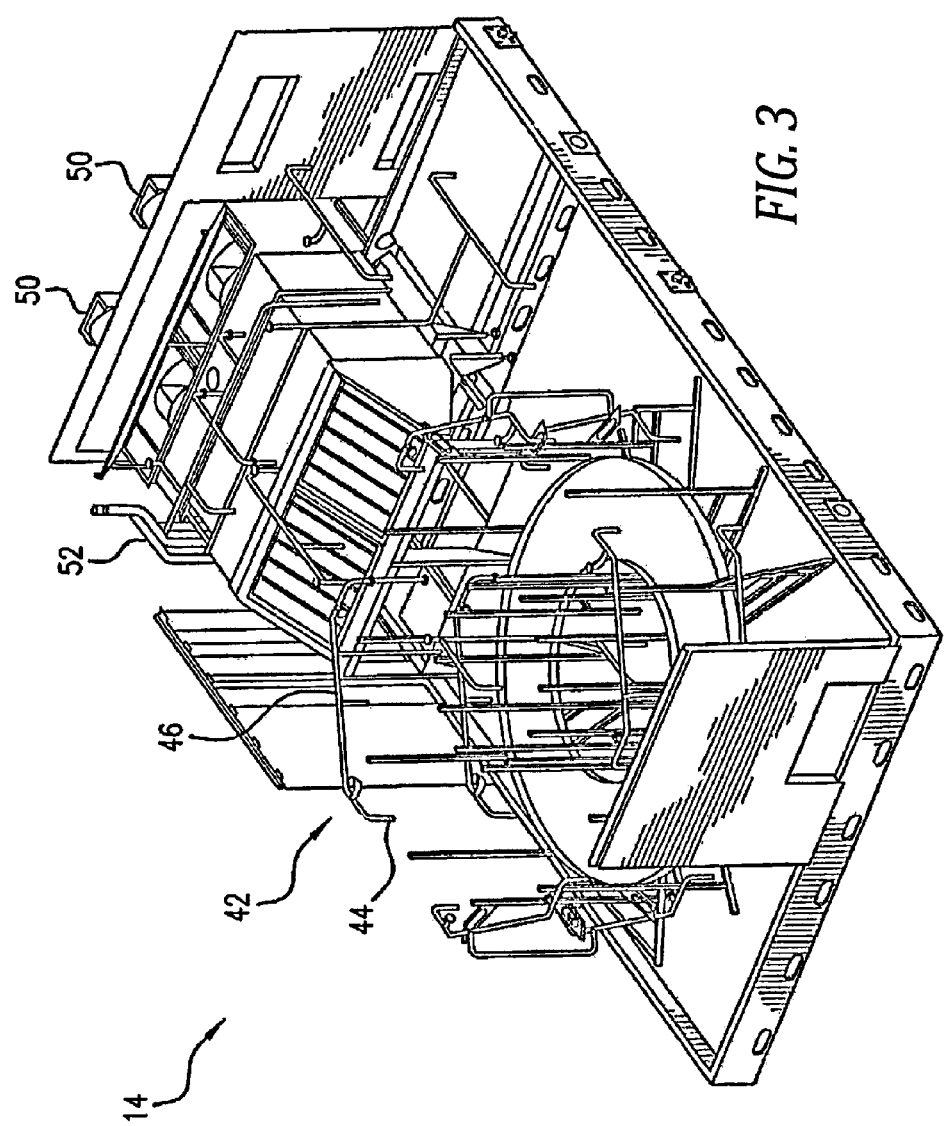
FIG. 3 is a partial schematic view of a first cooking chamber of a continuous cooking oven system according to one embodiment of the invention.

A desired cooking environment is created within the first cooking chamber 14 by providing at least one source of heat such as steam, super heated steam or heated air either alone or in combination. Referring to FIGS. 2 and 3, the heated gaseous cooking medium may be introduced in the low pressure region 38 of the first cooking chamber at a location adjacent one or more recirculating fans 50. The fan(s) 50 act to continuously circulate the heated gaseous medium from the low pressure region 38 to the high pressure region 36 separated by mezzanine floor 40. Suitably, the one or more fans 50 are housed within the first cooking chamber 14 such that a suction side of the fan is disposed in the low pressure region 38 while a high pressure side of the fan 50 is disposed in the high pressure region 36 of the first cooking chamber 14. In this way, the heated gaseous cooking medium may be circulated into the high pressure region 36 at high velocity. The fan 50 may include a flow diverter structure (not shown) to facilitate circulation of the heated gaseous cooking medium within the first cooking chamber 14. It should be recognized that the desired velocity at which the cooking medium is circulated throughout the first cooking chamber 14 may be varied by modifying the speed of the fan 50. Suitably, the fan 50 may be operated at a velocity of about 100 fpm (about 30 m/min) to about 1000 fpm (about 305 m/min) in the first cooking chamber 14.

Suitably, the gaseous cooking medium and/or air may be circulated within the first cooking chamber 14 such that the cooking medium and/or air is fully directed down onto a top surface of food products, directed up onto a bottom surface of food products and/or directed onto both the top and bottom surfaces of food products as they are transported through the first cooking chamber 14. Advantageously, the direction of airflow or gaseous medium flow may be controlled by the user on a predefined and/or adjustable time basis. Suitably, the pattern of air or gaseous cooking medium flow within the first cooking chamber 14 may be alternated between different flow patterns at preset or adjustable rates or may be programmed to follow a predefined time-based sequence of flow patterns.

Figure 5:
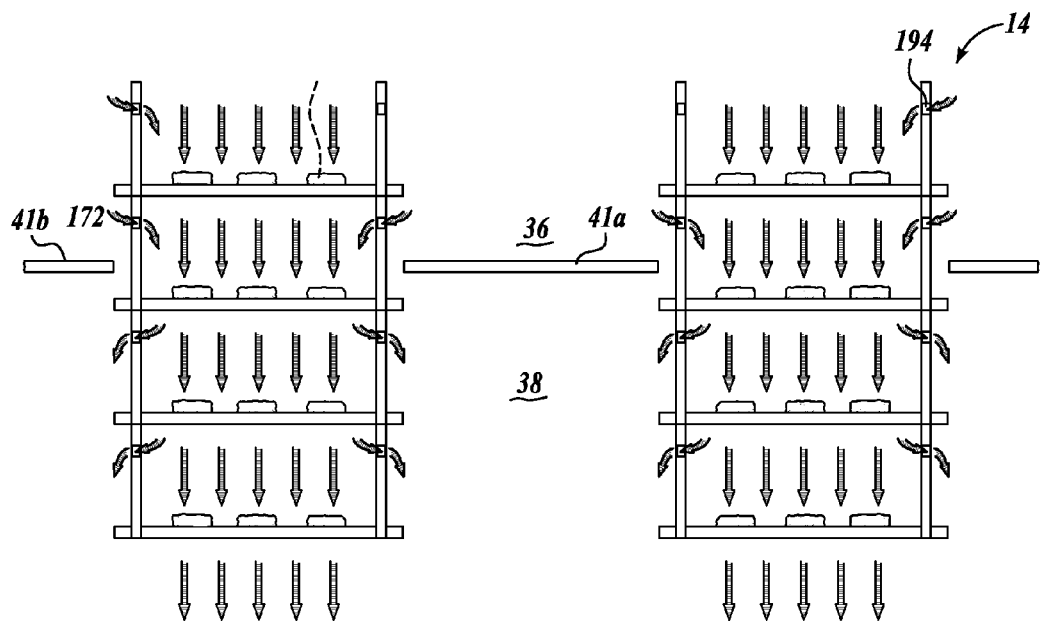
FIGS. 5 and 6 are schematic views of the flow of gaseous cooking medium in the first cooking chamber.
Figure 6:
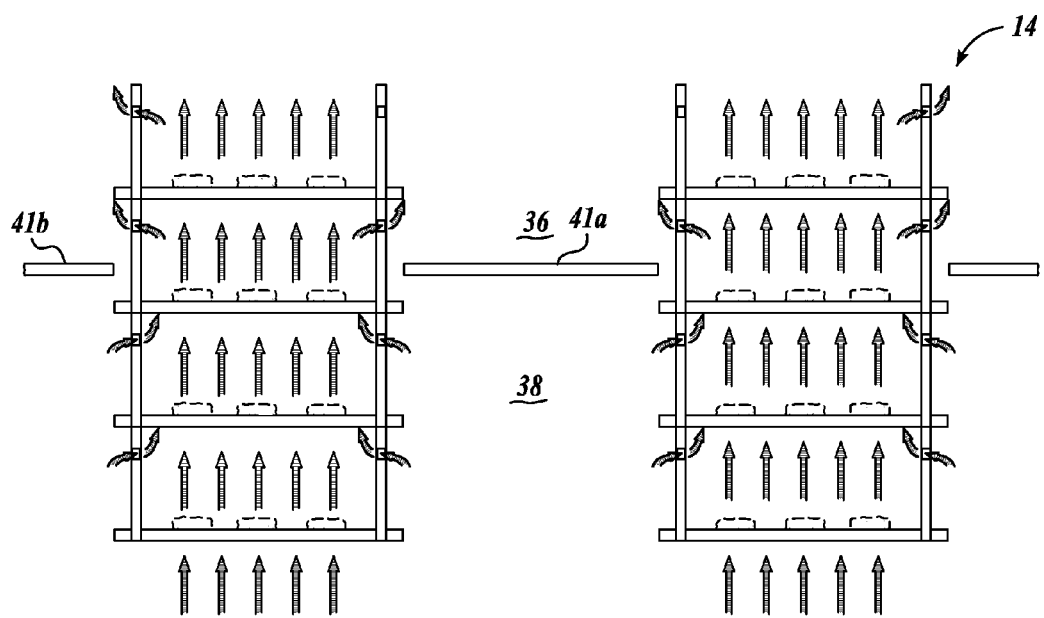

Suitably, the fans 50 may be controlled along with one or more internal air flow dampers (not shown) which are positioned within the first cooking chamber 14 as means of continuously reversing the air flow within chamber 14 on a user defined interval. Controlling the air flow in this manner within the first cooking chamber 14 allows the heated gaseous medium to be directed toward both the top and bottom surfaces of food products as they are transported through the chamber 14 and thereby allows a user to control the color development (i.e., browning) of the food products. See FIGS. 5 and 6.

Referring to FIG. 3, in the alternative or in combination with fan 50, steam may be supplied under pressure to the interior of the first cooking chamber 14 via a steam supply 52. Suitably, the steam supply 52 may be disposed relative to the fan 50 in the high pressure region 36.

The gaseous cooking medium in the first cooking chamber 14 may be heated using an indirect gas heating system, a direct gas heating system, steam, super heated steam and/or electric heating system. The provision of various sources of heated gaseous cooking medium allows a great amount of versatility in the operation of the continuous cooking oven system 10.

In one embodiment, steam may be used exclusively in the first cooking chamber 14, and slow thorough cooking of the food products may be achieved more efficiently. In a steam only environment, food products travel through the first cooking chamber 14 for slow cooking at a temperature of about 200° F. (about 95° C.) to about 600° F. (about 315° C.) in a high humidity or steam environment. In this way the food products may be thoroughly cooked while maintaining their moisture content.

Alternatively, a burner or other heat source may be used to achieve temperatures between about 90° F. (about 32° C.) and about 600° F. (about 315° C.) or about 200° F. (about 95° C.) to about 450° F. (about 235° C.) in the first cooking chamber 14. When used in combination, the steam supply and burner provide a high temperature cooking environment in conjunction with a high humidity or steam environment for more efficient cooking of food products.

Suitably, the temperature and/or humidity levels within the first cooking chamber 14 may be selectably controlled based upon the type of food product being cooked in the continuous cooking oven system 10.

A second continuous conveyor 54 is disposed within the second cooking chamber 16 to transport food products from the inlet opening 22, through a linear path within the second cooking chamber 16, to the outlet opening 24 of the second cooking chamber 16. Suitably, the second continuous conveyor 54 may transport food product through a downwardly extending path within the second cooking chamber 16. Suitably, the slope of the second continuous conveyor 54 is selected to prevent food products from sliding down or slipping off of the conveyor. In one embodiment, the second continuous conveyor 54 may slope downward at an angle 58 of up to about 30 degrees as measured from a floor 56 of the second cooking chamber 16, or about 5 to about 20 degrees or about 12 degrees. Orienting the second conveyor in this manner reduces the amount of space the continuous cooking oven system 10 occupies within a production facility.

In one embodiment, and as shown in FIG. 2, the first continuous conveyor 28 and the second continuous conveyor 54 may be in the form of a single continuous pervious conveyor belt 30. Suitably, the conveyor belt 30 enters the first cooking chamber 14 through inlet opening 18, travels through an upwardly extending helical path from a low pressure region 38 to a high pressure region 36 within the first cooking chamber 14, exits the first cooking chamber 14 through outlet opening 20, enters the second cooking chamber 16 through inlet opening 22, travels through a downwardly extending path within the second cooking chamber 16 to the outlet opening 24 of the second cooking chamber 16. Suitably, food products carried on the conveyor belt 30 are transferred to another conveyor or collection apparatus at the outlet opening 24 of the second cooking chamber 16. The conveyor belt 30 then travels through an upwardly extending path within the second cooking chamber 16, exits the second cooking chamber 16 through inlet opening 22, enters the first cooking chamber 14 through outlet opening 20, travels through a downwardly extending linear path from the high pressure region 36 to the low pressure region 38 within the first cooking chamber 14, and exits the first cooking chamber through the inlet opening 18.

A desired cooking environment is created within the second cooking chamber 16 by providing at least one source of heat such as steam, super heated steam and/or heated air. Suitably, the desired cooking environment is created within the second cooking chamber 16 by providing a source of heated gaseous cooking medium such as heated air which is circulated about the food products within the second cooking chamber 16. Advantageously, the heated gaseous cooking medium is circulated at a high velocity and an elevated temperature such that the heated gaseous cooking medium impinges upon the surfaces of the food product thereby causing the products to brown evenly on both an upper surface and a lower surface.

Suitably, the heated gaseous cooking medium is circulated within the second cooking chamber 16 at a velocity of about 400 fpm (about 120 m/min) to about 5000 fpm (about 1525 m/min).

Suitably, the heated gaseous cooking medium is circulated within the second cooking chamber 16 at a temperature of about 200° F. (about 95° C.) to about 750° F. (about 400° C.).

Figure 4:
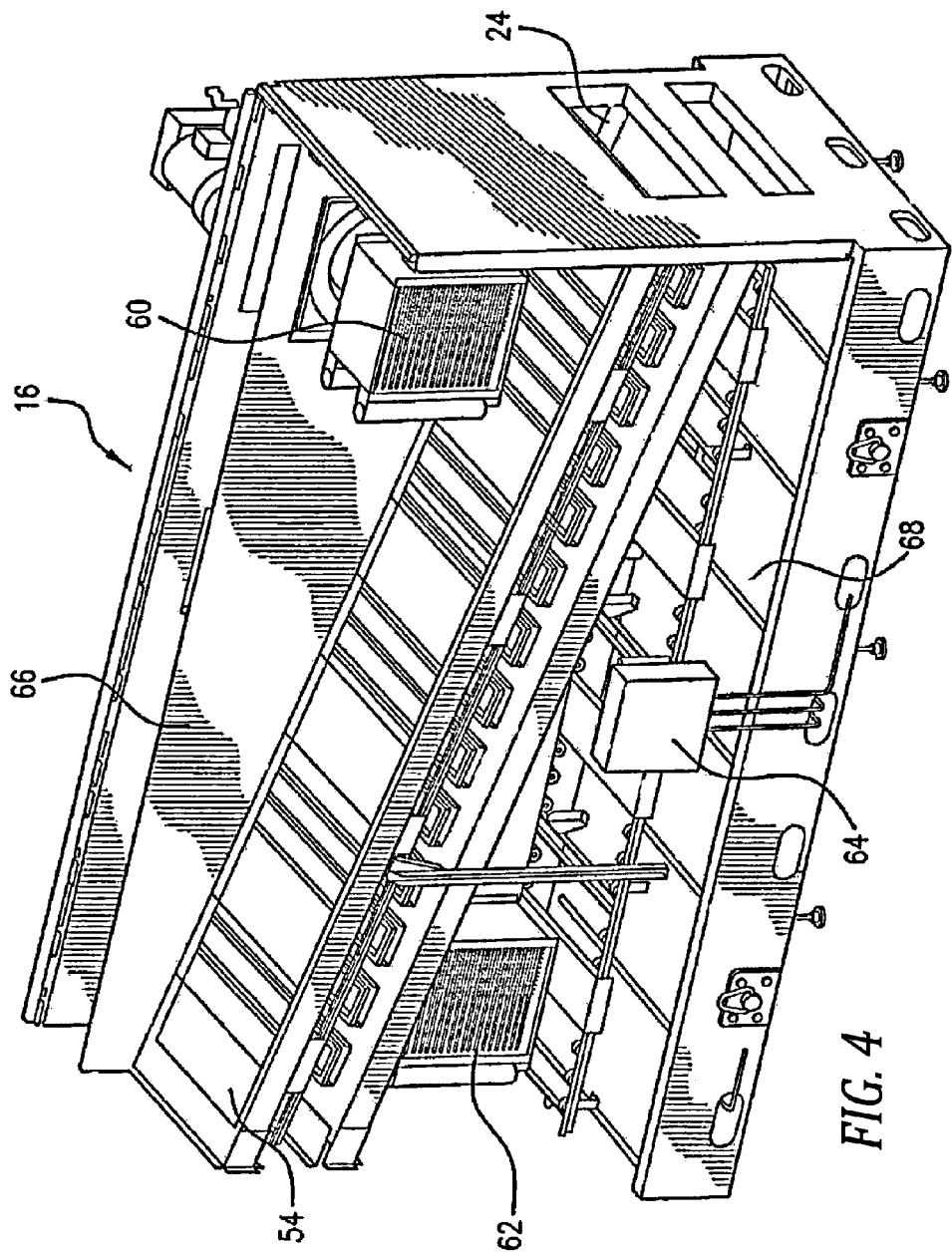
FIG. 4 is a schematic view of a second cooking chamber of a continuous cooking oven system according to one embodiment of the invention.

Referring to FIG. 4, the heated gaseous cooking medium is circulated within the second cooking chamber 16 by at least one impingement air flow distribution chamber 60 disposed above the second continuous conveyor 54 to circulate the heated gaseous cooking medium in an upper portion 66 of the second cooking chamber 16 and at least one impingement air flow distribution chamber 62 disposed below the second continuous conveyor 54 to circulate the heated gaseous cooking medium in a lower portion 68 of the second cooking chamber 16. In one embodiment, as shown in FIG. 1, at least one impingement air flow distribution chamber 60 is disposed above the second continuous conveyor 54 adjacent the outlet opening 24 within the second oven chamber 16 and at least one impingement air flow distribution chamber 62 is disposed below the second continuous conveyor 54 adjacent the inlet opening 22 within the second cooking chamber 16. The impingement air flow distribution chambers may include a combination of forced draft air flow and induced air flow to generate desired and uniform conditions throughout the second cooking chamber 16.

Each impingement air flow distribution chamber 60, 62 includes at least one recirculation fan (not shown). Suitably, each recirculation fan is independently controlled such that the fan speed may be varied to achieve desired attributes. For example, a recirculation fan of the impingement air flow distribution chamber 62 may be operated at a higher speed than a recirculation fan of impingement air flow distribution chamber 60 to ensure that a bottom surface of the food products browns at a level comparable to an upper surface of the food products which may have been partially browned in the first cooking chamber 14.

Suitably, the gaseous cooking medium within the second cooking chamber 16 may be heated using a direct gas heating system, an indirect gas heating system, steam, super heated steam, an indirect thermal oil heating system and/or an electric heating system. In one embodiment, the continuous cooking oven 10 may include a thermal fluid heat exchanger (not shown) in fluid communication with the second cooking chamber 16. The thermal fluid heat exchanger suitably directs heated gaseous cooking medium from the impingement air flow distribution chambers 60, 62 through the second cooking chamber 16 and across the second continuous conveyor 54. The thermal fluid heat exchange may be a super heated steam exchange, a direct gas fired heat exchanger or an indirect gas fired heat exchange. In one embodiment, the thermal fluid heat exchanger may be a flat plate heat exchanger, fin and tube heat exchanger or similar heat exchanger that includes an internally circulating flow of thermal fluid. The thermal fluid may suitably include synthetic thermal fluid oil such as a silicon based thermal fluid oil. Suitably, the heat exchange operates at a temperature of about 400° F. (about 205° C.) to about 750° F. (about 400° C.). Thermal fluid heating permits a higher humidity oven atmosphere than conventional gas-fired heating systems because of the absence of moisture diluting entering combustion air.

The continuous cooking oven system 10 may further include a steam supply in communication with second cooking chamber 16. Referring to FIG. 4, steam may be supplied under pressure to the interior of the second cooking chamber 16 via a steam supply 64.

Suitably, the first cooking chamber 14 and the second cooking chamber 16 may be operated under similar conditions. For example, the first and second cooking chamber 14, 16 may be operated with comparable air flow, air temperature and humidity levels. Alternatively, the first cooking chamber 14 and the second cooking chamber may be operated under different conditions.

Additionally, an in-place cleaning system may be disposed within the second cooking chamber 16 to remove grease and soil generated during the cooking process.

Food products which may be suitably cooked within the continuous cooking oven system 10 include, but are not limited to, beef, pork, fish, poultry, bakery products and/or other food products including food products having various coatings applied to at least a portion of an outer surface. Advantageously, temperature, humidity, air and/or heated gaseous cooking medium velocity and flow, and conveyor speed as well as other cooking parameters may be selectably controlled based on the type of food product to be cooked in order to achieve desired product quality and consistency. Suitably, the cooking parameters in each cooking chamber 14, 16 may be independently, selectably controlled.

In a further embodiment, not shown, a continuous cooking oven system may include a first cooking chamber disposed between and in serial communication with second and third cooking chambers. Each cooking chamber contains a heated gaseous cooking medium. A second conveyor transports food products through a linear path within the second cooking chamber to an inlet of the first cooking chamber. A first continuous conveyor continuous conveyor transport food products to be cooked through a helical path within the first cooking chamber to an inlet of the third cooking chamber. A third continuous conveyor transports food products from an outlet of the first cooking chamber through a linear path, suitably a downwardly extending linear path, within the third cooking chamber. Suitably, the second and third cooking chambers may use, at least in part, an air impingement system as described above to cook and/or brown food products on upper and lower surfaces, while the first cooking chamber may use, in part, a steam impingement system as described above to cook food products within the first cooking chamber. Suitably, the second and third cooking chambers include at least one impingement air distribution chamber disposed within each cooking chamber to circulate a heated gaseous cooking medium within each chamber.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

The invention claimed is:

1. A method of cooking in a continuous cooking oven system, the method comprising:
   (a) transporting food products on a continuous conveyor through a helical path within a first cooking chamber, wherein the continuous conveyor includes a self-supporting, pervious belt assembly, wherein the belt assembly includes a plurality of inner and outer links extending substantially normal to the pervious belt to create a helical stack having inner and outer sidewalls, the helical stack defining a plurality of superimposed, helically extending tiers and an inner channel in fluid communication with at least some of the tiers;
   (b) directing a substantially vertical flow of a heated gaseous cooking medium into either a top end or a bottom end of the helical stack to impinge the top or bottom surfaces of the food products disposed on the plurality of superimposed tiers;
   (c) dividing the first cooking chamber into first and second regions to divert a portion of the substantially vertical flow of a heated gaseous cooking medium to a substantially horizontal cross flow of heated gaseous cooking medium across each of the plurality of superimposed tiers in the helical stack; and (d) selectively reversing the substantially vertical flow of heated gaseous cooking medium on a user defined interval between (1) a substantially upward direction at the bottom end of the helical stack through the pervious belt to impinge the bottom surfaces of the food products disposed on the pervious belt and (2) a substantially downward direction at the top end of the helical stack to impinge the top surfaces of the food products disposed on the pervious belt, wherein the first region is a high pressure region and the second region is a low pressure region when the flow of heated gaseous cooking medium travels in the substantially downward direction, wherein the second region is a high pressure region and the first region is a low pressure region when the flow of heated gaseous cooking medium travels in the substantially upward direction, and wherein the heated gaseous cooking medium, when traveling in the substantially upward direction, does not directly impinge the top surfaces of the food products and when traveling in the substantially downward direction, does not directly impinge the bottom surfaces of the food products.

2. The method of claim 1, wherein dividing the first cooking chamber into first and second regions includes disposing a mezzanine assembly in the first cooking chamber.

3. The method of claim 2, wherein disposing a mezzanine assembly in the first cooking chamber includes disposing a first mezzanine portion in the inner channel of the helical stack and a second mezzanine portion extending around the outer perimeter of the helical stack.

4. The method of claim 3, further comprising positioning the first and second mezzanine portions at substantially the same elevation relative to the helical stack.

5. The method of claim 1, wherein the gaseous cooking medium does not directly impinge the top surfaces of the food products allowing the top surfaces of the food products to cool.

6. The method of claim 5, wherein after allowing the top surfaces of the food products to cool, reversing the substantially vertical flow of heated gaseous cooking medium to a substantially downward direction at the top end of the helical stack to impinge the top surfaces of the food products.

7. The method of claim 1, wherein the substantially horizontal cross flow of heated gaseous cooking medium flows from a high pressure region into at least some of the plurality of superimposed tiers in the helical stack through holes in the inner and outer links.

8. The method of claim 1, wherein the substantially horizontal cross flow of heated gaseous cooking medium flows out of at least some of the plurality of superimposed tiers in the helical stack through holes in the inner and outer links into a low pressure region.

9. The method of claim 1, further comprising selectively browning the top and bottom surfaces of the food products.

10. The method of claim 1, further comprising transporting the food products to a second cooking chamber.

11. The method of claim 10, wherein the food products travel through the second cooking chamber in a substantially linear path.

12. The method of claim 11, wherein the food products travel through the second cooking chamber on a downward slope.

13. The method of claim 10, further comprising selectively browning in the second cooking chamber a bottom surface of the food products at a first rate and a top surface of the food products at a second rate, the second rate being different than the first rate.

14. A method of cooking in a continuous cooking oven system, the method comprising:

(a) transporting food products on a continuous, pervious conveyor through a helical path within a cooking chamber;

(b) directing a substantially vertical flow of a heated gaseous cooking medium into either a top end or a bottom end of the helical stack and through the plurality of superimposed tiers;

(c) dividing the cooking chamber into first and second regions to divert a portion of the substantially vertical flow of a heated gaseous cooking medium to a substantially horizontal cross flow of heated gaseous cooking medium across each of the plurality of superimposed tiers in the helical stack; and (d) selectively reversing the substantially vertical flow of heated gaseous cooking medium on a user defined interval between (1) a substantially upward direction at the bottom end of the helical path to impinge the bottom surfaces of the food products disposed on the pervious conveyor and (2) a substantially downward direction at the top end of the helical path to impinge the top surfaces of the food products disposed on the pervious conveyor, wherein the first region is a high pressure region and the second region is a low pressure region when the flow of heated gaseous cooking medium travels in the substantially downward direction, wherein the second region is a high pressure region and the first region is a low pressure region when the flow of heated gaseous cooking medium travels in the substantially upward direction, and wherein the heated gaseous cooking medium, when traveling in the substantially upward direction, does not directly impinge the top surfaces of the food products allowing the top surfaces of the food products to cool, and wherein a substantially horizontal cross flow of heated gaseous cooking medium flows out of at least some of the plurality of superimposed tiers in the helical stack through holes in inner and outer links into a low pressure region.

15. A method of cooking in a continuous cooking oven system, the method comprising:

(a) transporting food products through a helical path on a plurality of superimposed tiers within a cooking chamber;

(b) directing a substantially vertical flow of a heated gaseous cooking medium into either a top end or a bottom end of the helical stack and through the plurality of superimposed tiers;

(c) separating the cooking chamber into a first region and a second region; and (d) selectively reversing the direction of the substantially vertical flow of heated gaseous cooking medium on a user defined interval to switch the locations of high and low pressure regions, wherein the first region is a high pressure region and the second region is a low pressure region when the flow of heated gaseous cooking medium travels in the substantially downward direction, wherein the second region is a high pressure region and the first region is a low pressure region when the flow of heated gaseous cooking medium travels in the substantially upward direction, and wherein the heated gaseous cooking medium, when traveling in the substantially upward direction, does not directly impinge the top surfaces of the food products and when traveling in the substantially downward direction, does not directly impinge the bottom surfaces of the food products.

* * * * *